(12) United States Patent  
Menon et al.

(10) Patent No.: US 11,809,496 B2  
(45) Date of Patent: *Nov. 7, 2023

(54) DATA ACCESS USING SORTED COUNT MAPPING

(71) Applicant: SAP SE, Walldorf (DE)

(72) Inventors: Parthasarathy Menon, Kozhikode (IN); Rohit Jalagadugula, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,414

(22) Filed: Dec. 16, 2022

(65) Prior Publication Data

US 2023/0124235 A1    Apr. 20, 2023

Related U.S. Application Data

(63) Continuation of application No. 17/460,959, filed on Aug. 30, 2021, now Pat. No. 11,562,026.

(51) Int. Cl.
*G06F 16/00* (2019.01)
*G06F 16/901* (2019.01)
*G06F 16/22* (2019.01)

(52) U.S. Cl.
CPC ...... *G06F 16/9024* (2019.01); *G06F 16/2272* (2019.01)

(58) Field of Classification Search
None
See application file for complete search history.

(56) References Cited

U.S. PATENT DOCUMENTS

| 6,813,734 | B1 * | 11/2004 | Bhardwaj | H04J 3/0608 |
| | | | | 714/48 |
| 8,762,393 | B2 * | 6/2014 | Lee | G06F 18/23 |
| | | | | 707/750 |
| 9,208,257 | B2 * | 12/2015 | Milenova | G06F 16/35 |
| 9,525,606 | B1 * | 12/2016 | Staggs | H04L 67/5682 |
| 2017/0300593 | A1 * | 10/2017 | Inoue | G06F 16/9024 |
| 2020/0104425 | A1 * | 4/2020 | Shin | G06F 16/904 |

* cited by examiner

*Primary Examiner* — Debbie M Le
(74) *Attorney, Agent, or Firm* — Mintz Levin Cohn Ferris Glovsky and Popeo, P.C.

(57) ABSTRACT

A method, a system, and a computer program product for accessing data. A data stream including a plurality of data elements is received. A mapping of the plurality of data elements is generated. Each data element is represented by a data node in the mapping. A linked list of the data nodes with starting and ending elements is generated. Each node is linked to at least another node and stores a count of a data element and the corresponding data element. The count represents a number of times the data element is present in the data stream. Each node is positioned in the generated linked list using the count of each data element. Data elements with a highest count are positioned proximate to the starting element and data elements with a lowest count are positioned proximate to the ending element. Data elements are accessed using the generated mapping.

20 Claims, 12 Drawing Sheets

DATA ACCESS USING SORTED COUNT MAPPING

CROSS REFERENCE TO RELATED APPLICATION

This application is a continuation of U.S. patent application Ser. No. 17/460,959 filed on Aug. 30, 2021, entitled "DATA ACCESS USING SORTED COUNT MAPPING". The entire contents of this application is incorporated herein by reference in its entirety.

TECHNICAL FIELD

This disclosure relates generally to data processing and, in particular, to using sorted counting processes for faster data access.

BACKGROUND

Modern computing systems process vast amounts of data as part of their operation. Data may be received from various data sources and may be transmitted in a data stream. Received data is typically stored temporarily, permanently, etc. Periodically, received data may include data elements that occur more than once. Storage and subsequent access to such multiple occurrences of data elements is typically time consuming. To reduce that time, value or item counting as well as data element priorities may be used to determine presence of multiple occurrences of data elements. However, such methods typically require additional processing and do not provide immediate access to data.

SUMMARY

In some implementations, the current subject matter relates to a computer implemented method for accessing data using a sorted counting mapping. The method may include receiving a data stream including a plurality of data elements, generating a mapping of the plurality of data elements, where each data element may be represented by a data node in the generated mapping, and generating a linked list of the data nodes corresponding to the plurality of data elements. The linked list may include a starting element and an ending element. Each node in the plurality of nodes may be linked to at least another node in the plurality of nodes. Each node in the linked list may store a count of a data element in the plurality of data elements and the corresponding data element. The count may represent a number of times the data element is present in the data stream. The method may also include positioning, in the generated linked list, each node using the count of each data element in the plurality of data elements. Data elements in the plurality of data elements having a highest count may be configured to be positioned proximate to the starting element of the linked list and data elements in the plurality of data elements having a lowest count may be configured to be positioned proximate to the ending element of the linked list. Further, the method may include accessing, using the generated mapping, one or more data elements in the plurality of data elements.

In some implementations, the current subject matter can include one or more of the following optional features. In some implementations, each node in the linked list may be configured to store one or more identifiers identifying one or more adjacent nodes (e.g., previous and next nodes in the linked list) to the node.

In some implementations, at least one of the starting elements and the ending element may be configured to include an identifier and a position in the linked list of each data element. The positioning of nodes may include comparing counts included in one or more nodes in the linked list to determine a position of each node in the linked list.

In some implementations, the linked list may include a plurality of sections of nodes, each section of nodes in the plurality of nodes is linked to at least another section of nodes in the plurality of nodes. Each section of nodes in the plurality of sections of nodes may include one or more nodes having data elements with a predetermined count. Sections of nodes in the plurality of sections of nodes having nodes including data elements with a highest count may be configured to be positioned proximate to the starting element of the linked list and sections of nodes in the plurality of sections of nodes having nodes including data elements with a lowest count may be configured to be positioned proximate to the ending element of the linked list. Further, each section of nodes in the plurality of sections of nodes may include a corresponding section starting element and a corresponding section ending element. Each section starting element and each section ending element may be a node in the corresponding section of nodes.

In some implementations, data elements in the plurality of data elements may include at least one of the following: a video data, an audio data, an image data, a text data, a speech data, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
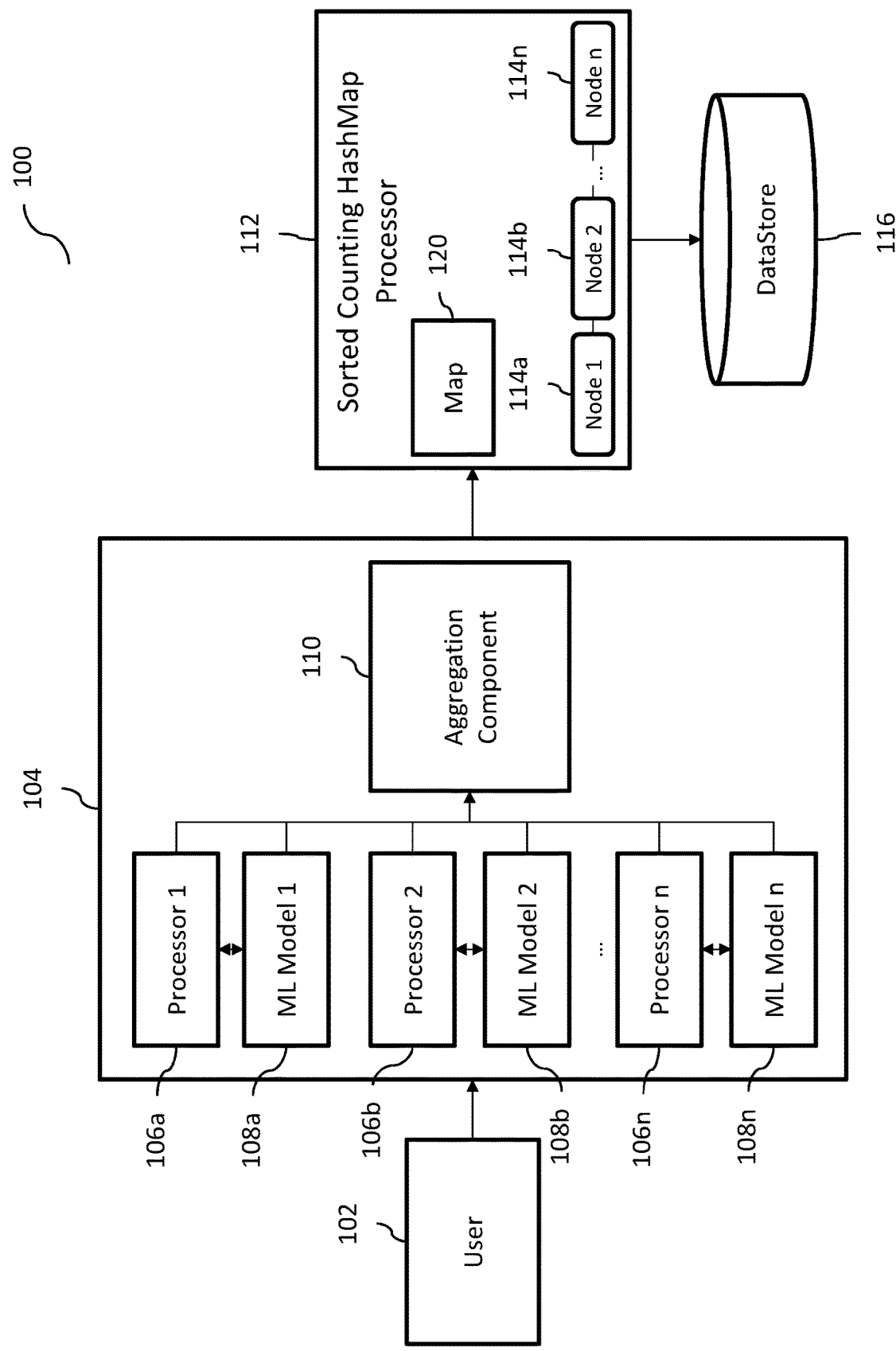
FIG. 1 illustrates an exemplary system for performing insertion and sorting of data elements, values, items, etc. at the same time, according to some implementations of the current subject matter.

To address these and potentially other deficiencies of currently available solutions, one or more implementations of the current subject matter relate to methods, systems, articles of manufacture, and the like that can, among other possible advantages, provide for an ability to execute an efficient counting of data elements in a list and/or a stream of data, and provide expedite access to that data.

Modern data processing systems (e.g., servers, computers, database systems, etc.) receive vast amounts of data that may be generated, for example, by users using various software applications, applications generating data through interactions with other applications, etc. The generated data is typically transmitted to one or more servers, database management systems (e.g., databases), etc. in a stream of data. The data may be destined for storage, backup, and/or any other processing. Data may also be stored in tables, lists, etc. Database management systems may be configured as a row-store database or column store database, each of which may have certain aspects with respect to queries and other operations at the database.

Further, file storage and/or processing systems may be centralized through the use of one or more servers, which can offload processing and/or storage from client devices accessing the one or more servers. However, although servers may make it easier and/or more convenient for users to store/access data from virtually anywhere, servers may still only have a limited processing and/or storage capacity (e.g., a server or set of servers may only be able to process so many things at one time without degrading performance). Hence, owners/operators of servers may wish to optimize transmission, access, and/or processing procedures performed at the servers while reducing complexity associated with such data transmission, access, and/or processing. Thus, at least some of the subject matter described herein relates to systems and methods for provide an ability to perform counting of various data elements, values, items, etc. in a data stream that may be transmitted between computing devices, systems, databases, etc.

Data element, value and/or item counting may refer to determining a count of occurrences of such data elements, values, and/or items from a data list and/or data stream (e.g., data stream being transmitted from one computing system to another (e.g., servers, databases, computing devices, etc.). It may be used to determine a most frequently occurring, a least frequently occurring and/or first 'x' elements, values, items, etc. which may be used for the purposes of analyzing transmitted data (such as to determine data patterns, e.g., emotional responses of users during online meetings, user shopping patterns, applications uses, troubleshooting of computing applications, error detection, etc.).

In some cases, for the purposes of data element, value, item, etc. counting, storage, etc. a hash table may be used. A hash table may refer to a data structure that may implement an associative array abstract data type, whereby such data structure may map one or more keys to one or more values. A hash table may also use a hash function to determine (e.g., compute) an index, also referred to as a hash code, into an array of locations, "buckets" and/or "slots", from which a desired value may be extracted. Alternatively, or in addition to, a hash map may be used. A hash map may be similar to the hash table, however, unlike the hash table, the hash map is not synchronized. This allows the hash map to allow for faster processing, access, etc. than the hash table. The hash map may allow storage of null keys (which might not be possible in the hash table). In the hash map, only one null key object may be permitted, while multiple null values may exist.

When data is being transmitted for processing, storage, etc., a priority queue may be implemented. The priority queue may refer to an abstract data type that may be similar to a regular queue and/or stack data structure. In the priority queue, each data element may have a priority associated with it. For example, in the priority queue, a data element having a high priority may be processed, transmitted, etc. before a data element having a low priority. The priority may be assigned automatically, manually, and/or in any other fashion.

A heap queue may be used as a priority queue implementation. In some cases, the heap queue may be preferable for priority queue implementation as it provides an improved performance as compared to arrays and/or linked lists. A heap queue may refer to a specialized tree-based data structure that satisfies the following heap property: in a maximum heap, for any given node C, if P is a parent node of C, then the key (the value) of P is greater than or equal to the key of C. In a minimum heap, the key of P is less than or equal to the key of C. The node at the top of the heap queue (i.e., a node with no parent nodes) may be referred to as the root node.

However, while various conventional systems exist (which may rely on any of the above aspects) for determining counts of data elements, values, items, etc. in a data stream, list, etc., such systems are not capable of performing an efficient counting of data elements, values, items, etc. in a data stream, list, etc. These systems are not able to generate a count of each data element, value, item, etc. immediately and determine top 'x' items associated with a highest count and a lowest count.

Some existing solutions implement a map and sort method. In this method, all data elements, values, items, etc. are added to a map. A count of data elements, values, items is incremented each time a repetition of data element, value, item, etc. is encountered. At the end of the list, the data elements, values, items, etc. of the map are sorted to generate a list of data elements, values, items, etc. in sorted format based on their counts. If a linked hash map is used, the data elements, values, items, etc. sorted by their counts as a primary sort factor and the order in which they occurred as a secondary sort factor. However, the map and sort method cannot be used for continuous processing of data streams/data inputs, as it generates counts of data elements, values, items, etc. at the end only after completion of the data stream transmission/data input. Further, sorting of data elements, values, items, etc. is executed separately from map generation (insertion of data elements, values, items, etc.). Additionally, to preserve an order of data elements, values, items, etc. as inserted, a separate linked hash map is created, which further slows down processing. Lastly, a complexity associated with processing of data elements, values, items, etc. using the map and sort method is O(n log n), where O(n) is the complexity for insertion of all data elements, values, items, etc. into the map and O(n log n) is the complexity for sorting of the data elements, values, items, etc. after insertion.

Another existing solution uses priority queues. Using this method, a priority queue with each item as a node containing a data element, value, item, etc. and its corresponding count is generated. The data elements, values, items, etc. are stored in a map in order to obtain data elements, values, items, etc. immediately and increment the corresponding count. The priority is determined as the count of each data element, value, item, etc. Data elements, values, items, etc. are added one by one and whenever a count of an item increases, re-heapifying process is executed so that the top data element, value, item, etc. is always of highest priority. While using this method data elements, values, items, etc. of highest priority can be obtained at any time, it has at least the following limitations. Specifically, only the top data element, value, item, etc. having the highest priority can be obtained at any time. This can be the data element, value, item, etc. with highest count or the lowest count, which must be decided beforehand. Additionally, re-heapifying process is a slow task that substantially increases an amount of processing time. Additionally, similar to the map and sort method, a complexity associated with processing of data elements, values, items, etc. using the priority queue method is O(n log n), where O(n) is the complexity for insertion of all data elements, values, items, etc. into the map and O(log n) is the complexity for re-heapifying process that is executed during insertion of each data element, value, item, etc. into priority queue.

FIG. 1 illustrates an exemplary system 100 for performing insertion and sorting of data elements, values, items, etc. at the same time, according to some implementations of the current subject matter. The system 100 may use a map and a linked list to preserve a sorted order of data elements, values, items, etc. based on an occurrence and insertion order of data elements, values, items, etc.

The system 100 may include one or more users 102, a computing system 104, a sorted counting hashmap processing component 112, and a database (e.g., datastore) system 116, which may store results of the processes executed by the sorted counting hashmap processing component 112. The users 102, the computing system 104, the sorted counting hash map processing component 112 and/or the database system 116 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 116 may include at least one of the following: databases, storage locations, memory locations, and/or any combination of hardware and/or software components.

The computing system 104 may include any combination of software and/or hardware components. The computing system 104 may be configured to receive data from one or more users 102. The data may include, for example, but is not limited to, files, strings, audio, video, text, graphics, and/or any other data elements, values, items, etc. The received data may be processed using one or more processors 106(a, b, . . . n) using one or more corresponding machine learning (ML) models 108(a, b, . . . n). For example, a video data (e.g., live video during an online meeting) transmitted by the user 102 to the computing system 104 may be received by the processor 106a (e.g., a video processor). The processor 106a may process the received video data to extract one or more frames from the video data and then use the corresponding model 108a that may be trained to determine one or more inference data from one or more video frames contained in the received video data. The inference data may be indicative of one or more user emotions (e.g., happy, sad, angry, etc.), and/or any other parameters/aspects. The models 108 may be trained to extract appropriate parameters/aspects. Other processors-models 106-108 may be used to receive, determine, and extract inference data that may be related to other types of data, e.g., audio/speech, text, etc.

Once the received data has been processed by the processors-models 106-108, the processed data may be transmitted to the aggregation component 110. The aggregation component 110 may generate a continuous stream of data for input to the sorted counting hashmap processing component 112. Alternatively, or in addition to, the processors-models 106-108 may transmit data directly to the sorted counting hashmap processing component 112. Moreover, a single processor 106 may be used to process all data received from the user(s) 102 and transmit it to the component 112. Further, the component 112 may directly receive data from the user(s) 102 for generating counts, sorting, etc., as discussed herein.

The sorted counting hashmap processing component 112 may be any combination of software and/or hardware components. The component 112 may include computer processors, computing networks, software applications, servers, user interfaces, and/or any other combination of hardware and/or software components. Operation of the component 112 is discussed in further detail below.

The database system 116 may be used to store results of the operation of the component 112. The results may be stored in one or more tables. In some implementations, the database system 116 may include one or more servers, processors, memory locations, cloud computing components/systems, etc. that may be used for accessing data.

The database table(s) may include at least one column and may store any kind of data. For example, the data may include, but is not limited to, definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

In some implementations, the system 100 (and/or any portion thereof) may be implemented as a cloud-based database management system (e.g., not including the user devices 102). A cloud-based database management system may be a hardware and/or software system for receiving, handling, processing, and/or executing the sorting and/or counting of data elements, values, items, etc. The database 116 may be a structured, organized collection of data, such as schemas, tables, queries, reports, views, and/or the like, which may be processed for information.

The processing component 112 and/or database 116 may be physically stored in a hardware server or across a plurality of hardware servers. In some implementations, communication may occur between the processing component 112 and the database 116. A cloud-based database management system may be a hardware and/or software system that interacts with a database, document store, users, and/or other software applications for defining, creating, and/or updating data, for receiving, handling, optimizing, and/or executing database/document store queries, and/or for running applications which utilize a database/document store. Although the processing component 112 and the database 116 are illustrated as being separate and, at times, described as being separate, in various implementations, at least a portion of the processing component 112 and the database 116 may be combined.

The processing component 112 may be configured to generate a list of nodes 114(a, b, ..., n) that may be configured to include data elements and a map 120 of the data elements. The map 120 may be configured to identify the data elements and their locations, as discussed below.

Figures 1, 2:
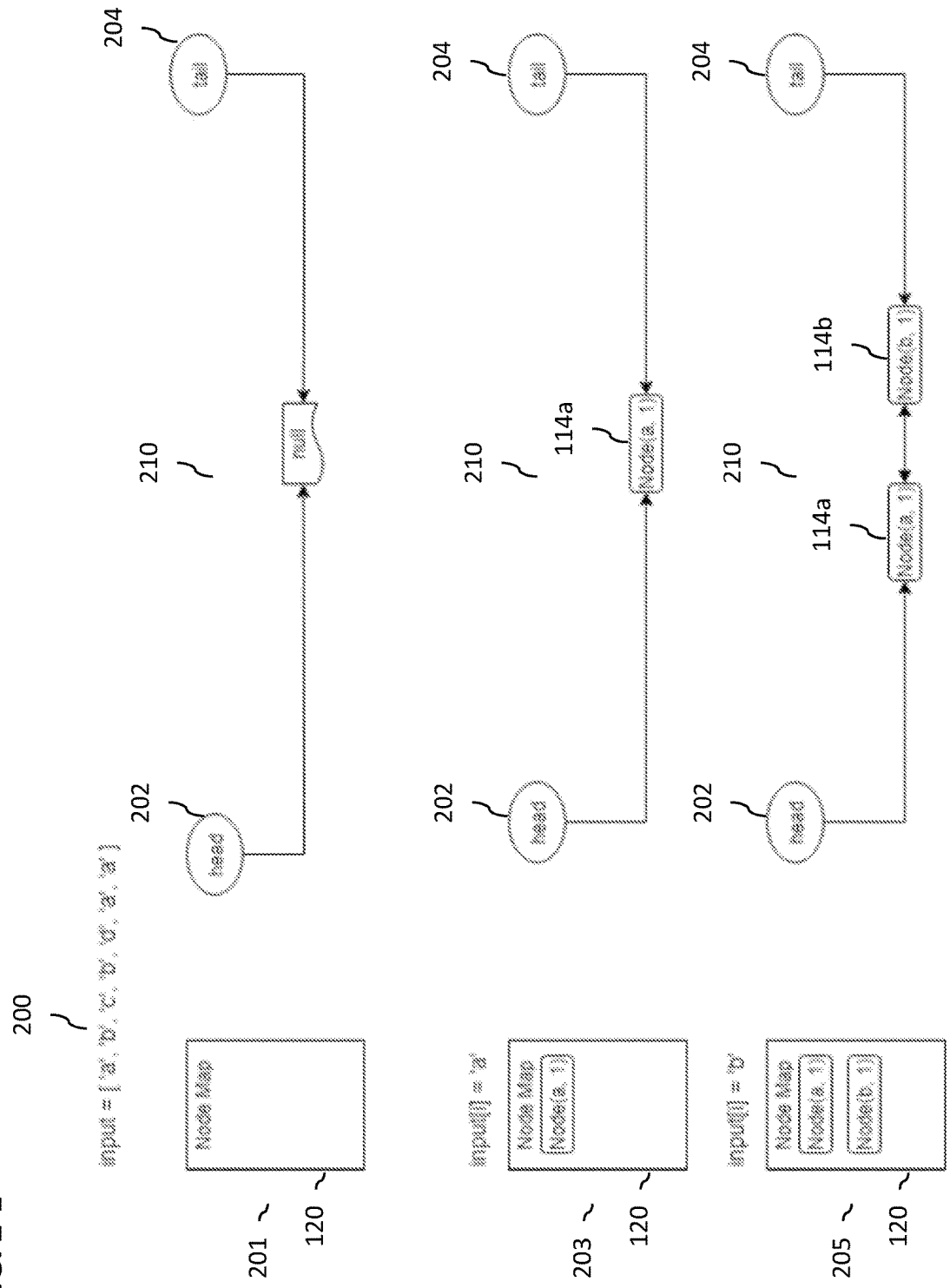
FIG. 2 (shown in parts 1-3) illustrates an exemplary data sorting process, according to some implementations of the current subject matter.
Figure 2:
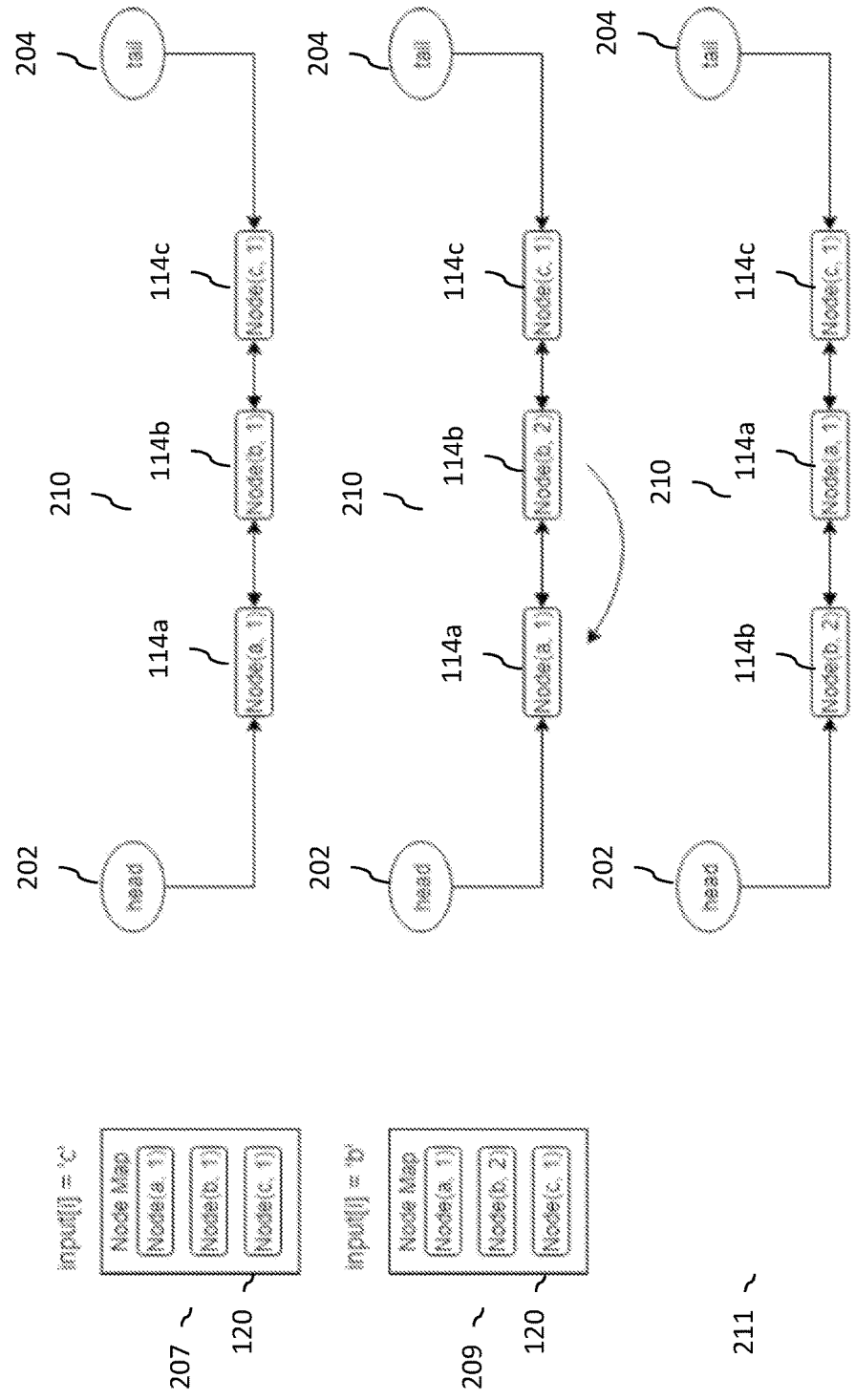

FIG. 2 (shown in parts 1-3) illustrates an exemplary data sorting process 200, according to some implementations of the current subject matter. The process 200 may be executed by the processing component 112 using a data stream of data elements, values, items, etc. (hereinafter, "data elements") that may be received by it (e.g., from computing system 104, user(s) 102, and/or any other data sources).

In particular, the processing component 112 may be configured to use a map 120 for inserting each data element and finding repetitions of the same data element. The map 120 may be arranged as a key-value data structure. Each key of the key-value data structure may be the data element itself and the value of the structure may refer to a node 114 that includes (e.g., stores) the data element (e.g., in database 116) and its respective count. The count may refer to the number of time that a particular data element has been encountered (either in the current data stream and/or in any and/or all data streams that may have been received by the processing component 112). The node 114 may also include a previous pointer (e.g., identifying a previous data element in the data stream) and a next pointer (e.g., identifying a next data element in the data stream). The pointers may be used by a doubly linked list.

The doubly linked list may be configured to add each new data element to a list of data elements as that data element is encountered in the data stream. A map 120 of received data elements may be generated by the processing component 112. As stated above, the map 120 may be in the form of a key-value data structure (i.e., key being the data element itself, and value being the node that includes the data element). If the data element is already present in the generated map, the processing component 112 may determine that that data element already exists in the list of data elements. The processing component 112 may then update the count of data elements for the encountered data element and check for the node's (containing the encountered data element) new position in the list by comparing the node's previous count to the new count of the current node. The processing component 112 the correct location of this node in the list and update the previous and next data element pointers (i.e., identifying previous and next data elements in the list).

In some implementations, the list may be configured to include a header or a head of the list and an ending or a tail of the list. With every new data element encountered/processed by the processing component 112, the head and tail of the doubly linked list may be updated/stored. The head of the list may be configured to identify and/or point to the data element having a highest count that first received the highest count (or any data element in the list with the highest count). Further, the head may also identify the first data element in the list (which may correspond to the data element with the highest count). The tail of the list may be configured to identify and/or point to the data element having a lowest count in the list. The tail may also identify and/or point to the last data element in the list. Moreover, the tail/head and/or the map may also include/store information about how many data elements are in the list, each data element's count, node location of each data element, its neighboring nodes, and/or any other information. To check a count of any data element, a query of the map may be executed to obtain the count of the data element immediately.

It should be noted that the complexity of the above structure may be expressed as $O(n*k)$ where $k<<<n$, where $O(n)$ corresponds to complexity for insertion of all data elements into the map 120. For each new data element, the processing component may add a node to end of list, where complexity associated with the new data element may be expressed as $O(1)$. For data elements that already exist in the list, a node 114 may be found in $O(1)$ time and updating its location may be configured to consume $O(k)$ time, where k is the number of nodes 114 to check in front of a current node to find its correct position in the list.

FIG. 2 illustrates the above process in further detail. As shown in FIG. 2, an input data stream 200 that may include data elements ['a', 'b', 'c', 'b', 'd', 'a', 'a'] may be received by the processing component 112 (not shown in FIG. 2). At stage 201, a list 210 may have a NULL value as no data elements have been processed. The list 210 may include a head 202 and a tail 204. Since the list 210 has a NULL value, the node map 120 may also be empty.

At stage 203, a first data element 'a' from the input data stream 200 may be processed by the processing component 112. Upon processing of the first data element 'a', the processing component 112 may check the map 120 to determine whether data element 'a' is already present in the map 120. Since the map 120 (as shown in FIG. 2) does not contain this data element, the processing component 112 may insert a node 114a into the map 120 so that a listing of the node 114a is included in the map 120, as shown in FIG. 2. The node 114a may be expressed as Node(a, 1), where "a" corresponds to a key, i.e., data element 'a', and 1 corresponds to a value, i.e., count value of data element 'a'. The processing component 112 may then insert the node 114a into the node or linked list 210 between head 202 and the tail 204.

At stage 205, a second data element 'b' from the input data stream 200 may be processed by the processing component 112. Upon processing of the second data element 'b', the processing component 112 may check the map 120 to determine whether data element 'b' is already present in the map 120. Since the map 120 does not contain data element 'b', the processing component 112 may insert a node 114b into the map 120 to include a listing of this node as shown in FIG. 2. The node 114b may be expressed as Node(b, 1), where "b" corresponds to data element 'b' and 1 corresponds to the current count value of data element 'b'. The processing component 112 may also insert the node 114b into the list 210 between node 114a (corresponding to the first processed data element) and the tail 204.

At stage 207, a third data element 'c' from the input data stream 200 may be processed by the processing component 112. Upon processing of the third data element 'c', the processing component 112 may check the map 120 to determine whether data element 'c' is already present in the map 120. Since the map 120 does not contain data element 'c', it may insert a node 114c into the map 120 to include a listing of this node as shown in FIG. 2. The node 114c may be expressed as Node(c, 1), where "c" corresponds to data element 'c' and 1 corresponds to the current count value of data element 'c'. The processing component 112 may also insert the node 114c into the list 210 between node 114b (corresponding to the second processed data element) and the tail 204. In some implementations, any new nodes (containing newly processed data elements) may be added at a tail's end of the list 210, i.e., between the last element in the list 210 and the tail 204.

At stage 209, a fourth data element 'b' from the input data stream 200 may be processed by the processing component 112. Upon processing of the fourth data element 'b', the processing component 112 may determine that that element already exists (i.e., node 114b). The map 120 may be checked to determine whether data element 'b' is already present in the map. Since the map 120 already contains data element 'b', the processing component 112 may update the count value of the node 114b to 2 (corresponding to data element 'b' occurring twice) in the map 120 to indicate that the count value of data element 'b' is 2, i.e., Node(b, 2).

Additionally, since the count value of the node 114b has increased to 2, the processing component 112 may be configured to rearrange position of the node 114b by moving it adjacent to the head 202. The head 202's (and/or the tail 204's) value indicating the counts of each of the processed data elements may be updated. As shown in FIG. 2, at stage 211, the node 114b (i.e., now Node (b, 2)) may now be positioned between the head 202 and the node 114a.

At stage 213, a fifth data element from the input data stream 200 may be processed by the processing component 112. Upon processing of the fifth data element 'd', the processing component 112 may check the map 120 to determine whether data element 'd' is already present in the map 120. Since the map 120 does not contain data element 'd', it may insert a node 114d into the map 120 to include a listing of this node as shown in FIG. 2. The node 114d may be expressed as Node(d, 1), where "d" corresponds to data element 'd' and 1 corresponds to the current count value of data element 'd'. The processing component 112 may also insert the node 114d into the list 210 between node 114c (corresponding to the third processed data element) and the tail 204. Again, since data element 'd' was processed last by the processing component 112, it may be added to the tail end of the list 210, i.e., between the last element (here, node 114c) in the list 210 and the tail 204. In some implementations, the map 120 may be configured to list nodes in the order of receipt of the data elements (with current counts).

At stage 215, a sixth data element 'a' from the input data stream 200 may be processed by the processing component 112. Upon processing of the sixth data element 'a', the processing component 112 may determine that that element already exists (i.e., node 114a). The map 120 may be checked to determine whether data element 'a' is already present in the map 120. Similarly to the processing of the second occurrence of data element 'b', since the map 120 contains data element 'a', the processing component 112 may update the count value of the node 114a to 2 (corresponding to data element 'a' occurring twice) which also updates the map 120 to indicate that the count value of data element 'a' is 2, i.e., Node(a, 2).

While the count value of the node 114a has increased to 2, its current position (as shown in FIG. 2) does not change as the processing of the second occurrence of data element 'a' was after processing of the second occurrence of data element 'b' (which also has a count of 2). This is because newly processed data elements (that may have the same count as other existing elements) are inserted into the list 210 from the tail's end. However, because the updated count of data element 'a' is greater than the corresponding counts of data elements 'c' and 'd', the processing component 112 may be configured to insert node 114a (i.e., now Node(a, 2)) ahead of the nodes with these data elements. The head 202's (and/or the tail 204's) value indicating the counts of each of the processed data elements and their corresponding locations may likewise be updated.

At stage 217, a seventh data element 'a' from the input data stream 200 may be processed by the processing component 112. Upon processing of the seventh data element 'a', the processing component 112 may determine that that element already exists (i.e., node 114a). Again, the map 120 may be checked to determine whether data element 'a' is already present in the map 120. Since the map 120 contains data element 'a', the processing component 112 may update the count value of the node 114a to 3 (corresponding to data element 'a' occurring thrice) which also updates the map 120 to indicate that the count value of data element 'a' is 3, i.e., Node(a, 3).

In this case, since the count value of the node 114a has increased to 3, the processing component 112 may be configured to rearrange position of the node 114a by moving to the front of the list, i.e., adjacent to the head 202. The processing component 112 may also update the head 202's (and/or the tail 204's) values indicating the counts of each of the processed data elements and their corresponding locations in the list 210. As shown in FIG. 2, at stage 219, the node 114a (i.e., now Node(a, 3)) may now be positioned between the head 202 and the node 114b (i.e., Node(b, 2)), whose count value is lower than the node 114a.

Figures 2, 3:
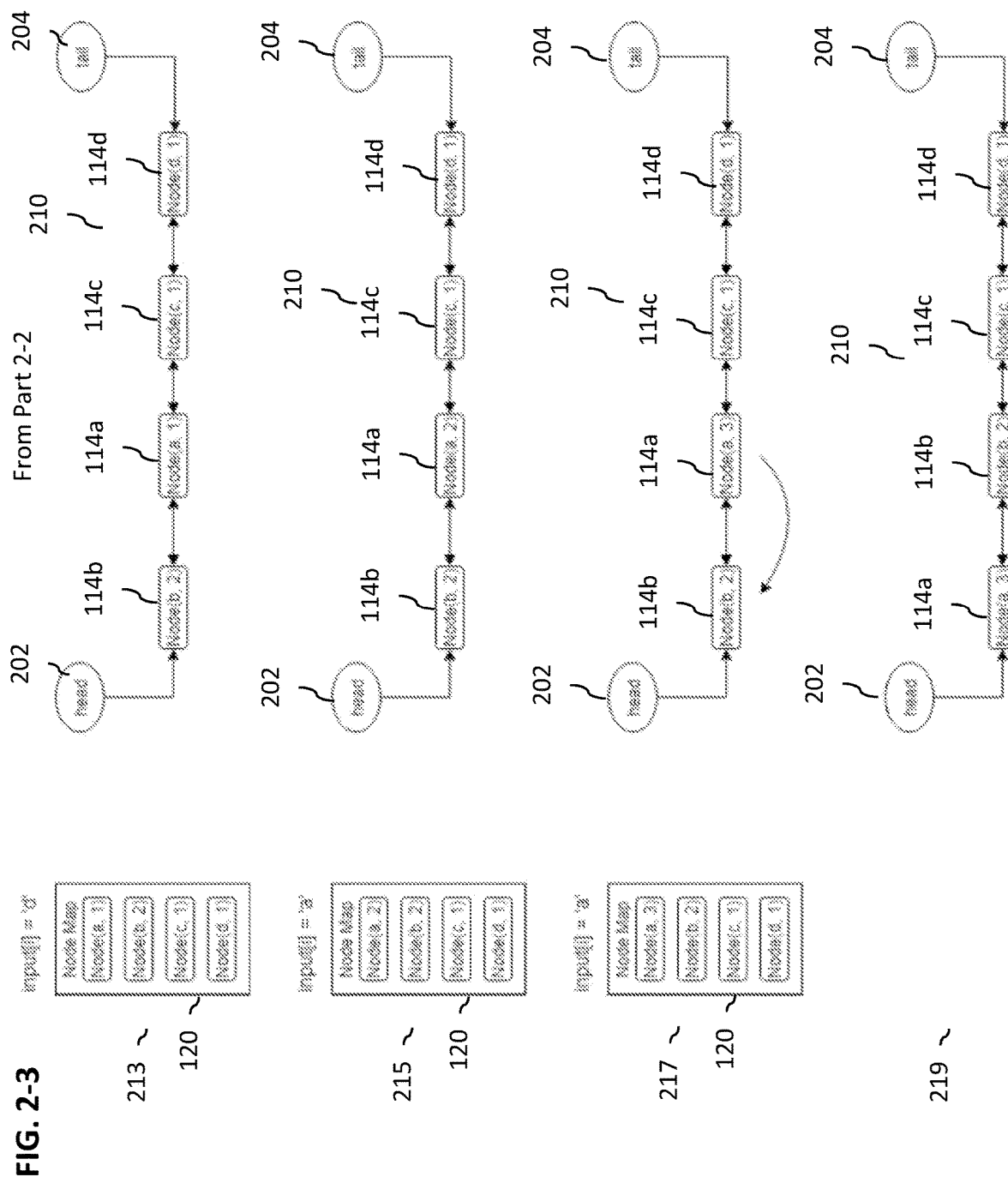
FIG. 3 illustrates an exemplary method for processing of data elements by the processing component of system shown in FIG. 1, according to some implementations of the current subject matter.
Figure 3:
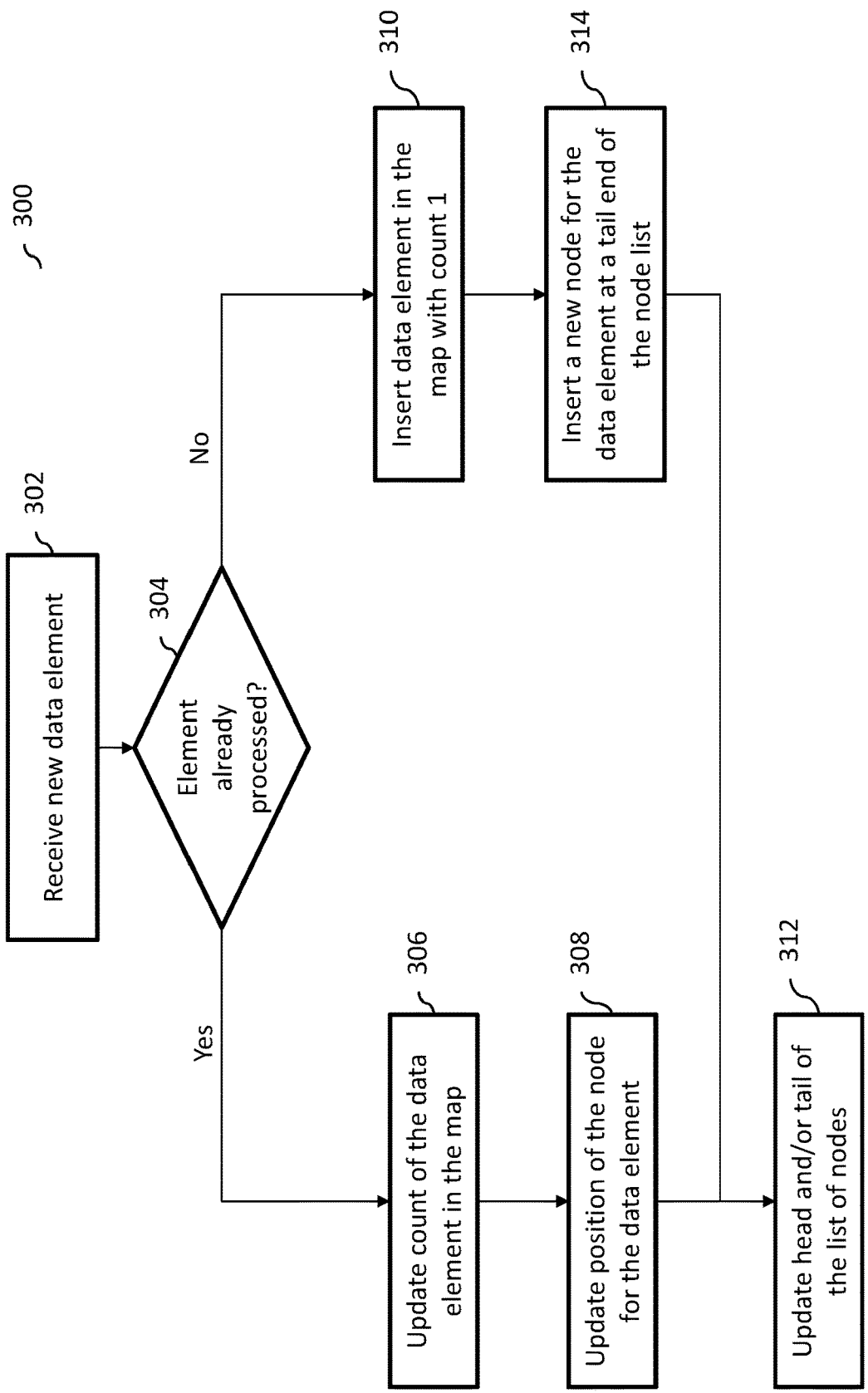

FIG. 3 illustrates an exemplary method 300 for processing of data elements by the processing component 112 of system 100, according to some implementations of the current subject matter. The method 300 may be performed by the processing component 112 using the processing guidelines/rules/etc. illustrated in FIG. 2 and discussed above. At 302, the processing component 112 may be configured to receive a data element for processing. The data element may be received as part of a continuous input data stream (e.g., input data stream 200 shown in FIG. 2).

At 304, the processing component 112 may be configured to determine whether the received data element has been previously processed (e.g., element 'b' at stages 209-211 shown in FIG. 2 and element 'a' at stages 215-217). If the received data element has been previously processed, the processing component 112 may be configured to update count for the received element, at 306, and update the map 120 with the information relating to the processed element (as shown in in stage 201-219 in FIG. 2). The processing component 112 may also update position of a node for that data element (e.g., moving node 114b with element 'b' to the front of the list at stage 211, for example, as shown in FIG. 2), at 308. Further, the head and tail of the list 210 may also be updated with information about newly processed data element, at 312. The operations 306, 308 and/or 312 may be performed simultaneously and/or one after the other.

If the received data element has not been previously processed, at 304, the processing component 112 may be configured to update the mapping 120 (and/or generate a new mapping 120) with a new node corresponding to the newly received data element (e.g., insert data element in the map with a count 1), at 310 and insert a new node corresponding to the newly processed data element into the node list 210 (e.g., insertion of new node 114a at stage 203, as shown in FIG. 2), at 314. The new node may be inserted at tail's end of the node list 210. After that the processing component 112 may perform operation 312.

In some implementations, the processing component 112 may be configured to implement a node sections map that may include each data element count and point to a section node. Each section node may include a start and an end that point to the node from which the particular count may start and end. This may be helpful in avoiding traversal of k nodes in front of a current node (e.g., corresponding to the newly added element) to set its position.

Using the sections map, each time a data element occurs in the input data element stream, if it is a new data element, it may be added to the section with count 1, i.e., the section from the sections map with a key value 1. If the data element is already present in the map, the section in which the node of the data element occurs may be updated.

The following operations may be performed when updating a section in which the node occurs. The processing component 112 may be determine the current section (assume for simplicity of illustration, it is called section A) in which the node is present in from the sections map. If the node is both a start and an end of the current section A, the processing component 112 may be configured to determine whether another section (assuming for simplicity of illustration, it is called B) exists with the new count of the node is present (hereinafter, "insert into sections map" operation). If yes, then the processing component 112 may be configured to add the current node as an end of section B. If not, then the processing component 112 may be configure generate a new section with a start and an end as the current node and include it in the sections map. The processing component 112 may then delete the section A from the sections map.

If the node is only the start of current section A, then the processing component may be configured to set the next data element of node as the start of section A and perform the "insert into sections map" operation If the node is the head of the linked list then there is no need to update anything as the node will remain the head of the linked list.

If the node is only the end of current section A, then the processing component 112 may be configured to set the end of section A to the node's previous pointer, remove the node from the list of nodes and adjust the pointers accordingly. If the node was the tail, then the processing component 112 may be configured to update tail to node's previous pointer. The processing component 112 may also be configured to move the node before section A's start in the node list since it already knows that the node should come before section A. If section A's start was the head, then the processing component 112 may be configured to update the head, and perform the "insert into sections map" operation.

If the node is neither the head nor the tail, then the processing component 112 may be configured to determine that the node comes between sections. In this case, the processing component 112 may be configured to remove the node from the node list and adjust the pointers. The processing component 112 may also move the node before the start of section A in the node list as it already knows that the node should come before section A. If the start of section A was the head, then the processing component 112 may update head, and perform the "insert into sections map" operation.

By using the sections map to mark the start and end nodes of each section in the node list 210, the processing component 112 may be configured to eliminate a need to traverse k nodes before the current node to determine its new position in the node list when the node's count is updated. In this case, the total complexity of the sections map may be computed as O(n). Here, O(n) may be the complexity for insertion of all items into a map. For each new item, the node may be added to end of list which is O(1) and sections map is updated in O(1). For items that already exist in the list, a node can be found in O(1) time and updating its location can take O(1) time since the location, to which the data element should be placed from the previous section, is known.

Figures 1, 4:
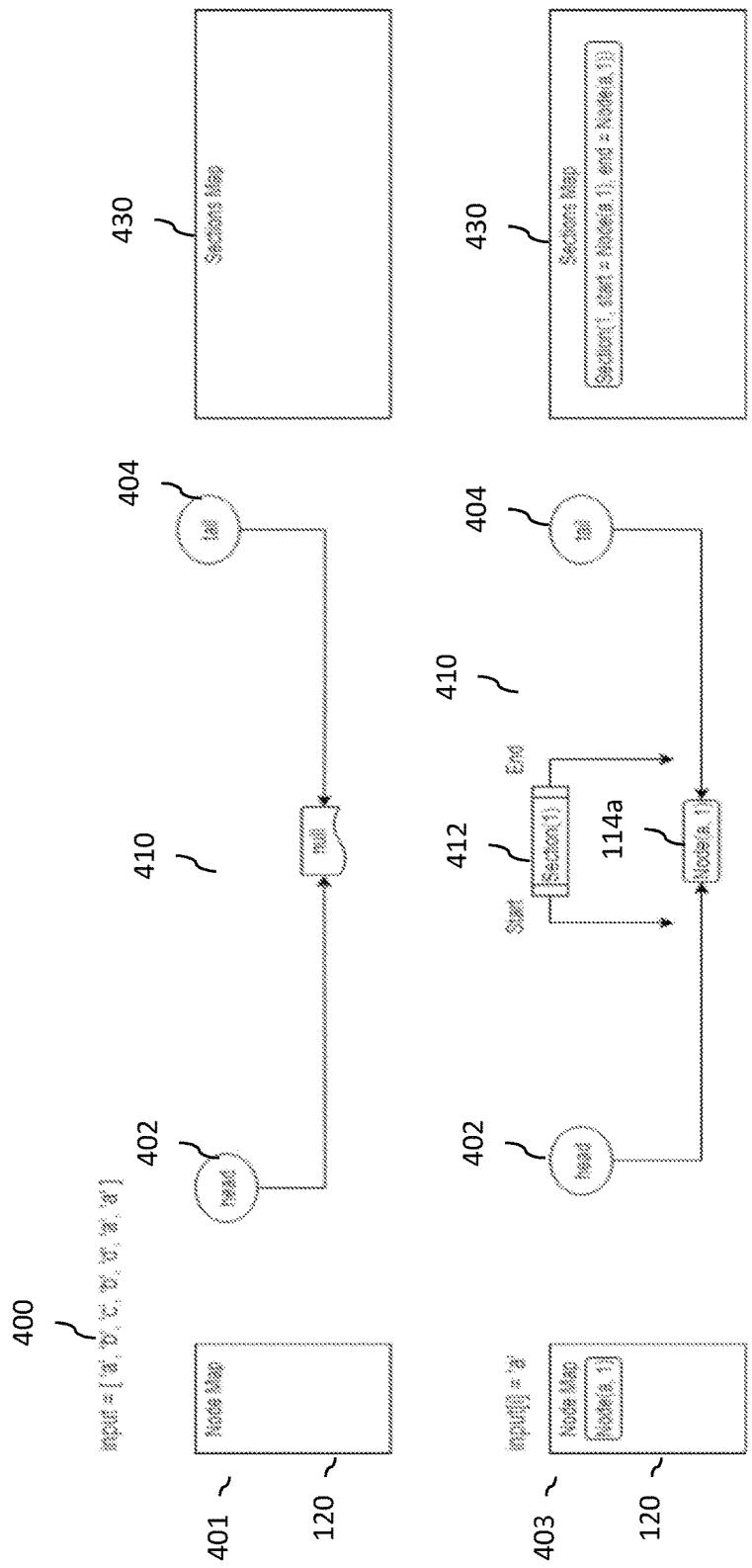
FIG. 4 (shown in parts 1-5) illustrates an exemplary data sorting process using sections, according to some implementations of the current subject matter
Figures 2, 4:
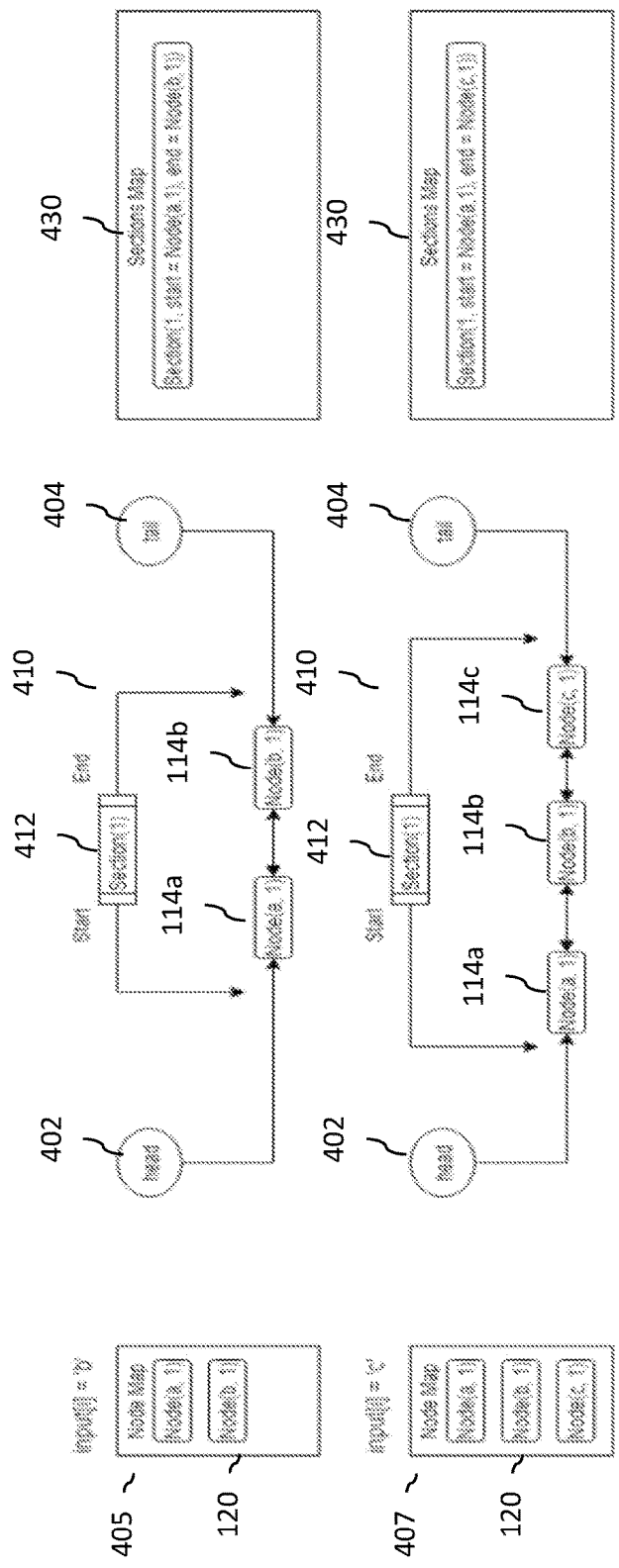
Figures 3, 4:
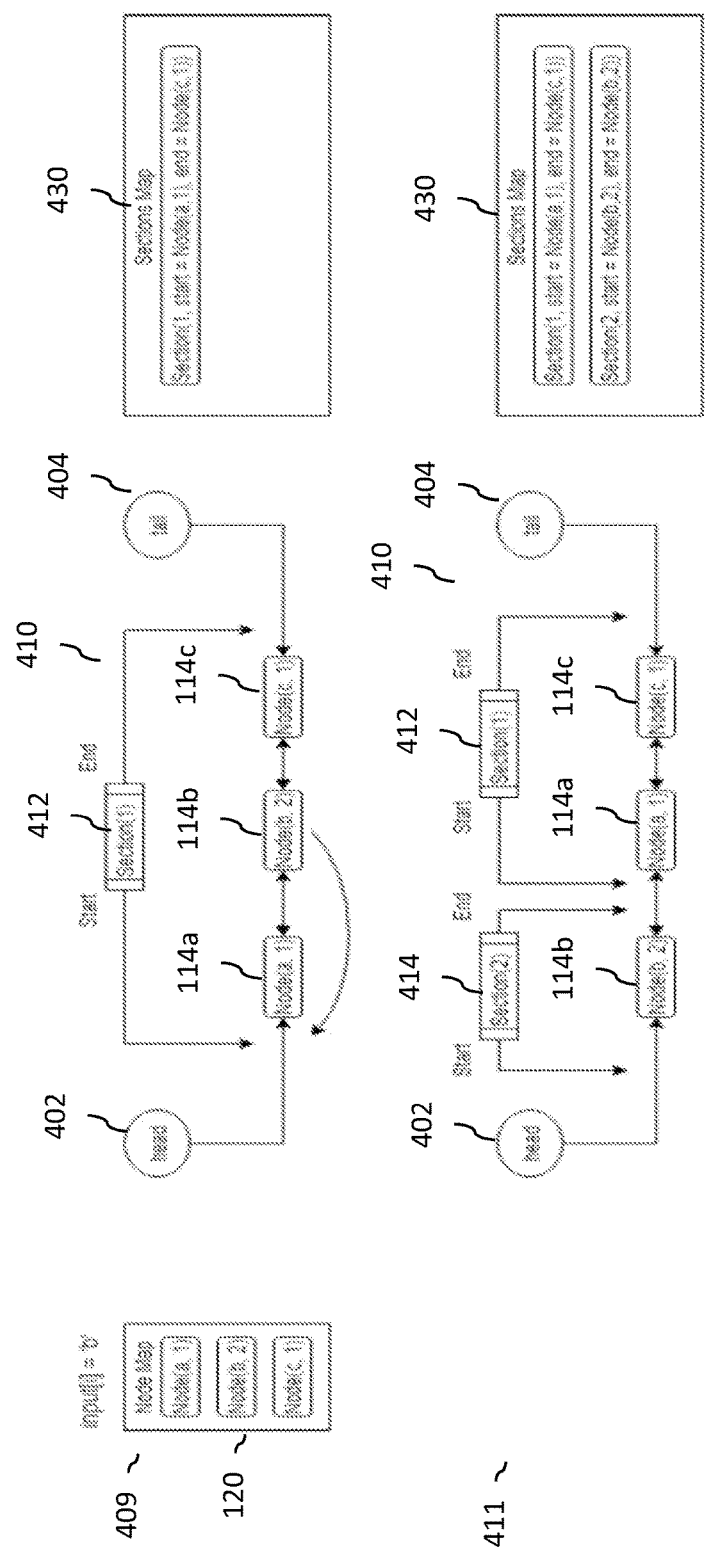
Figure 4:
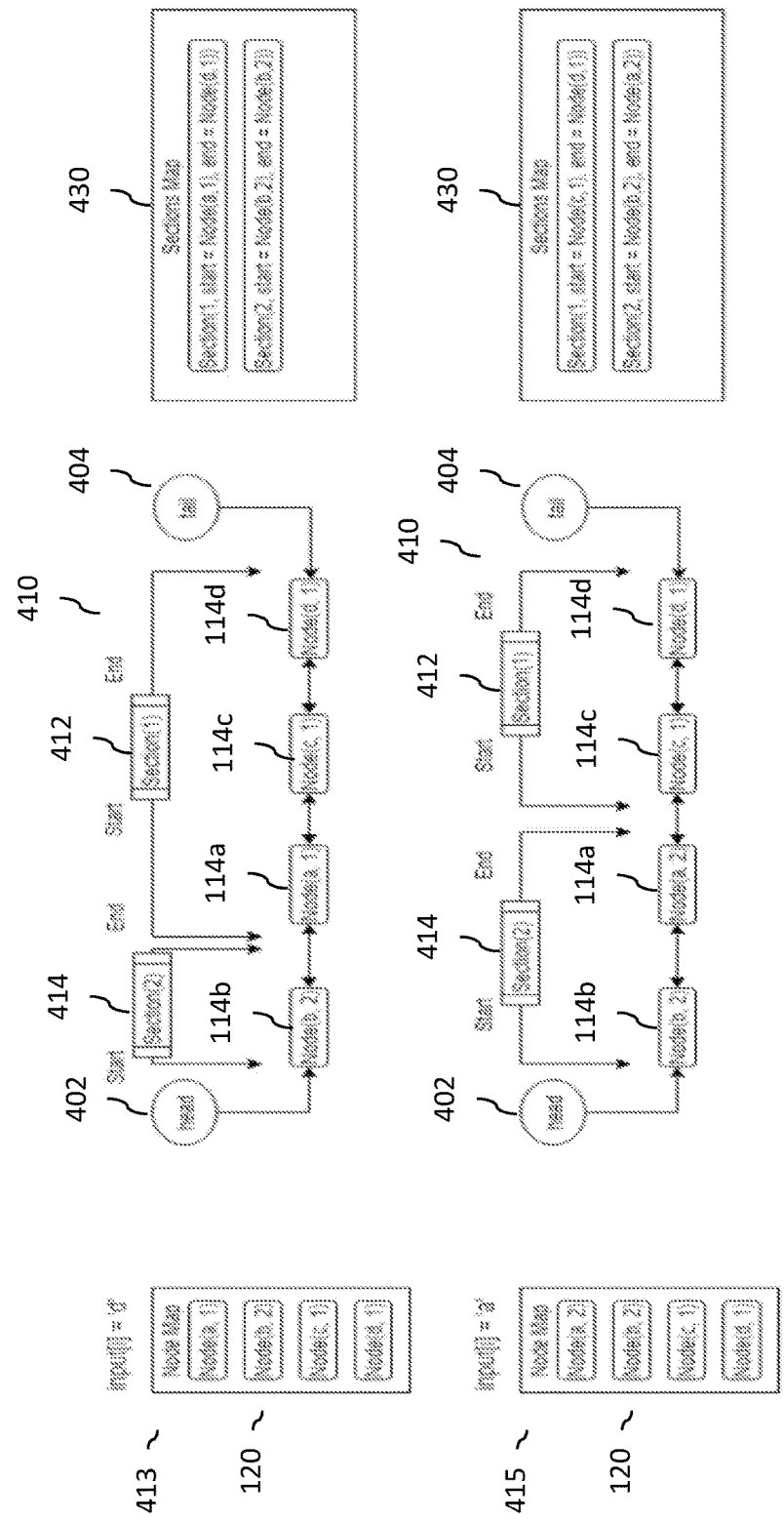

FIG. 4 illustrates the above process in further detail. As shown in FIG. 4, an input data stream 400 that may include data elements ['a', 'b', 'c', 'b', 'd', 'a', 'a'] may be received by the processing component 112 (not shown in FIG. 4). At stage 401 (similar to stage 201 in FIG. 2), a list 410 may have a NULL value as no data elements have been processed. The list 410 may include a head 402 and a tail 404. Since the list 410 has a NULL value, the node map 120 may also be empty. Similarly, a sections map 430 that may be generated by the processing component 112 may also be empty.

At stage 403, a first data element 'a' from the input data stream 400 may be processed by the processing component 112. Upon processing of the first data element 'a', the processing component 112 may check the map 120 to determine whether data element 'a' is already present in the map 120. Since the map 120 does not contain data element 'a', it may insert a node 114*a* into the map 120 to include a listing of this node as shown in FIG. 4. The node 114*a* may be expressed as Node(a, 1), where "a" corresponds to a key, i.e., data element 'a', and 1 corresponds to a value, i.e., count value of data element 'a'. The processing component 112 may insert the node 114*a* into the node or linked list 410 between head 402 and the tail 404.

Additionally, processing component 112 may generate a first section "Section (1)" 412 that includes Node(a, 1) 114*a*. The section 412's start and end correspond to Node(a, 1) 114*a*. The processing component 112 may also update the sections map 430 with the following entry: Section (1, start=Node(a, 1), end=Node(a, 1)), where "1" corresponds to the identifier of the section.

At stage 405, a second data element 'b' from the input data stream 400 may be processed by the processing component 112. Upon processing of the second data element 'b', the processing component 112 may check the map 120 to determine whether data element 'b' is already present in the map 120. Since the map 120 does not contain this data element, it may insert a node 114*b* into the map 120 to include a listing of this node as shown in FIG. 4. The node 114*b* may be expressed as Node(b, 1), where "b" corresponds to data element 'b' and 1 corresponds to the current count value of data element 'b'. The processing component 112 may also insert the node 114*b* into the list 410. The node 114*b*, expressed as Node(b, 1), may be inserted into the Section(1) 412, where the Node(a, 1) may be the start of the section 412 and the Node(b, 1) may be the end of the section 412. Additionally, the processing component 112 may update the sections map 430 with the following entry: Section (1, start=Node(a, 1), end=Node(b, 1)), corresponding to the above insertions.

At stage 407, a third data element 'c' from the input data stream 400 may be processed by the processing component 112. Upon processing of the third data element 'c', the processing component 112 may check the map 120 to determine whether element 'c' is already present in the map 120. Since the map 120 does not contain this data element, it may insert a node 114*c* into the map 120 to include a listing of this node as shown in FIG. 4. The node 114*c* may be expressed as Node(c, 1), where "c" corresponds to data element 'c' and 1 corresponds to the current count value of data element 'c'. The processing component 112 may also insert the node 114c into the list 410. The node 114c may be inserted into the Section(1) 412, where the Node(c, 1) may become the end of section 412 and Node(b, 1) may be positioned between the start of the section 412, i.e. Node(a, 1) and the Node(c, 1). Additionally, the processing component 112 may update the sections map 430 with the following entry: Section (1, start=Node(a, 1), end=Node(c, 1)), corresponding to the above insertions.

At stage 409, a fourth data element 'b' from the input data stream 400 may be processed by the processing component 112. Upon processing of the fourth data element 'b', the processing component 112 may determine that that element already exists (i.e., node 114b). The map 120 may be checked to determine whether element 'b' is already present in the map. Since the map 120 already contains this data element, the processing component 112 may update the count value of the node 114b to 2 (corresponding to data element 'b' occurring twice) in the map 120 to indicate that the count value of data element 'b' is 2, i.e., Node(b, 2).

Additionally, since the count value of the node 114b has increased to 2, the processing component 112 may be configured to rearrange position of the node 114b by moving it adjacent to the start of section 412, at stage 411. Moreover, because the count of the node 114b increased, the processing component 112 may be configured to create a new section—Section (2) 414 and remove Node(b, 2) from section 412. Section 414 may include Node(b, 2) as its start and end. Because Node(b, 2) is neither the start nor the end of Section 412, no changes may be performed to Section 412. The processing component 112 may also update the sections map 430 with the following entries: Section (1, start=Node(a, 1), end=Node(c, 1)) and Section (2, start=Node(b, 2), end=Node(b, 2)), corresponding to the above changes.

At stage 413, a fifth data element 'd' from the input data stream 400 may be processed by the processing component 112. Upon processing of the fifth data element 'd', the processing component 112 may check the map 120 to determine whether element 'd' is already present in the map 120. Since the map 120 does not contain data element 'd', it may insert a node 114d into the map 120 to include a listing of this node as shown in FIG. 4. The node 114d may be expressed as Node(d, 1), where "d" corresponds to data element 'd' and 1 corresponds to the current count value of data element 'd'. The node 114d may be added as the end of the section 412 and node 114c (corresponding to the third processed data element) may be moved up in the section 412. Because data element was processed last by the processing component 112, it may be added to the tail end of the section 412 in the list 410. Also, the processing component 112 may update the map 120 to include a listing of the Node(d, 1) after Node(c, 1). The processing component 112 may also update the sections map 430 with the following entries: Section (1, start=Node(a, 1), end=Node(d, 1)) (which is indicative of the change of the tail of the section 412 to Node(d, 1)) and Section (2, start=Node(b, 2), end=Node(b, 2)), corresponding to the above changes.

At stage 415, a sixth data element 'a' from the input data stream 400 may be processed by the processing component 112. Upon processing of the sixth data element 'a', the processing component 112 may determine that that element already exists (i.e., node 114a). The map 120 may be checked to determine whether data element 'a' is already present in the map 120. Similarly to the processing of the second occurrence of data element 'b', since the map contains data element 'a', the processing component 112 may update the count value of the node 114a to 2 (corresponding to data element 'a' occurring twice) which may also update the map 120 to indicate that the count value of data element 'a' is 2, i.e., Node(a, 2).

Moreover, because the count value of the node 114a has increased to 2, its current position (as shown in FIG. 4) in section 412 is no longer possible, as section 412 contains nodes with data elements having count of 1. As such, the processing component 112 may be configured to move the node 114a into section 414 together with node 114b, whereby the node 114a becomes the end of the section 414 and node 114b— its start. This is because newly processed data elements (that may have the same count as other existing elements) may be inserted into the sections from the section's end. Further, because node 114a is removed from section 412, node 114c (i.e. Node(1, c)) now becomes its start and node 114d remains as its end. The processing component 112 may update the sections map 430 to reflect that with the following entries: Section (1, start=Node(c, 1), end=Node(d, 1)) and Section (2, start=Node(b, 2), end=Node(a, 2)).

At stage 417, a seventh data element 'a' from the input data stream 400 may be processed by the processing component 112. Upon processing of the seventh data element 'a', the processing component 112 may determine that that element already exists (i.e., node 114a). Again, the map 120 may be checked to determine whether data element 'a' is already present in the map 120. Since the map 120 already contains data element 'a', the processing component 112 may update the count value of the node 114a to 3 (corresponding to data element 'a' occurring thrice) which also updates the map 120 to indicate that the count value of data element 'a' is 3, i.e., Node(a, 3).

Because the count of the node 114a has increased, it can no longer remain in section 414, as the section 414 includes nodes with counts of 2. Thus, at stage 419, the processing component 112 may be configured to create a new section (3) 416 and move node 114a into that section. With this rearrangement, node 114a becomes the start and end of section 416; node 114b becomes the start and end of section 414 (due to removal of node 114a from this section), and section 412 remains unchanged. To reflect the above changes, the processing component 112 may update the sections map 430 with the following entries: Section (1, start=Node(c, 1), end=Node(d, 1)), Section (2, start=Node (b, 2), end=Node(b, 2)), and Section (3, start=Node(a, 3), end=Node(a, 3)).

Using the current subject matter's processes, a substantial reduction in time consumed in processing and/or accessing the data. For example, to process approximately 22 Mb of data, the current subject matter's processes are approximately 3.75 times faster than conventional map method discussed above and approximately 4 times faster than the conventional priority queue method.

The current subject matter processes may be useful in cloud platform integration environments that may include multiple tenant computing systems, whereby such tenant computing systems may exchange various messages and store any associated metadata. Each tenant computing system in such environment may be configured to log the messages that may be received/transmitted by it and/or passed through it and may store various metadata information, e.g., type of message, adapter used, etc. Typically, tenant computing system's administrators request a metering connection data to determine the number of connections, types of connections, etc. Any information may be collected by the tenant computing system at runtime, parsed and then sent to the tenant administrator. This process typically includes connectivity between a provisioning application, tenant design time and tenant runtime, where a substantial amount time may be consumed by parsing, data formatting and creation of reports. The current subject matter may be configured to eliminate and/or substantially reduce this time (e.g., to a few seconds as compared to minutes) by keeping track of the number of messages as a count and a type of message/adapter as the data of the node. Each time a message passes through the tenant computing system, the count of the corresponding message type may be incremented and at any time, the most frequent messages may be obtained and displayed.

Figures 4, 5:
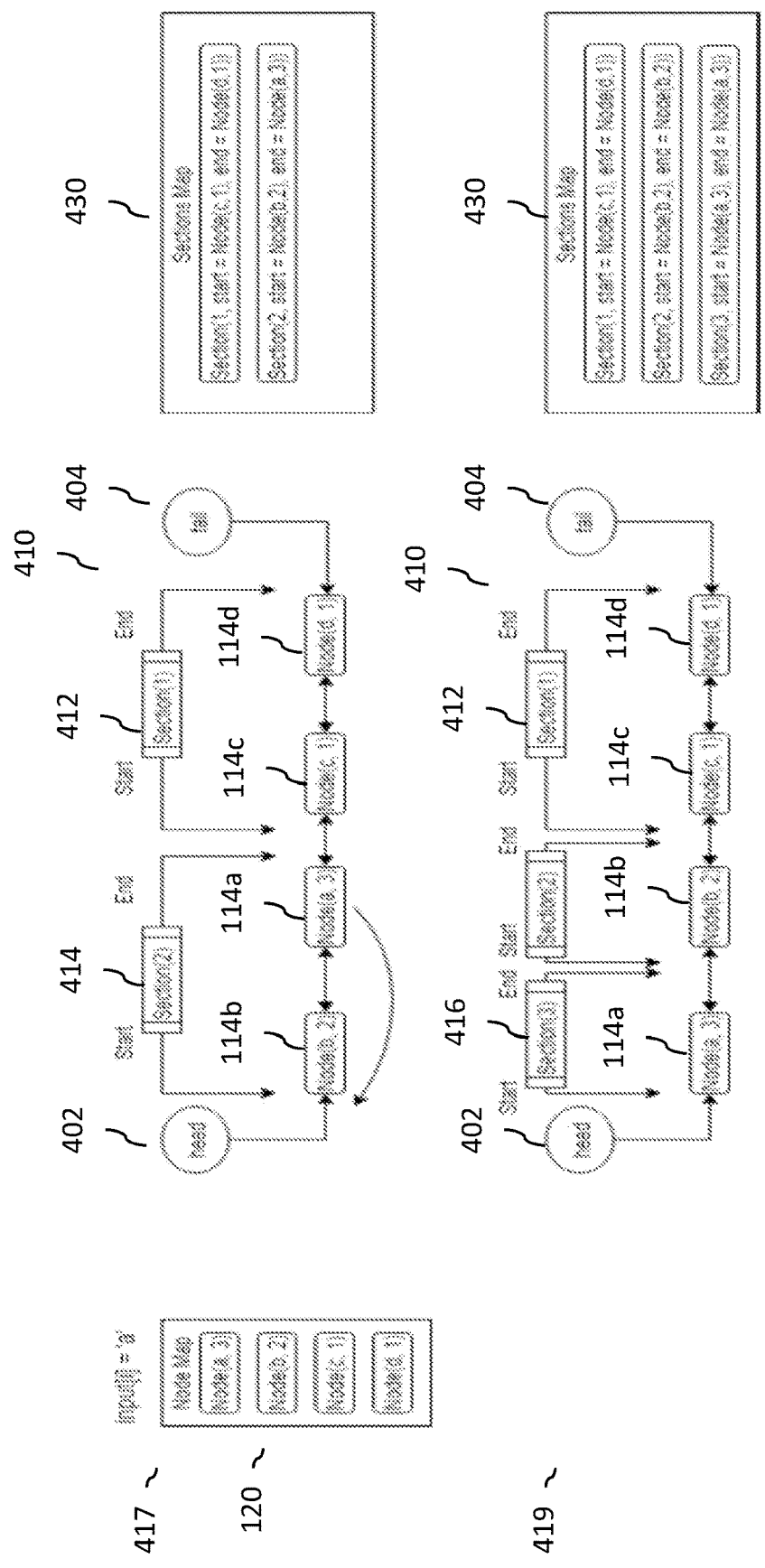
FIG. 5 is an exemplary system, according to some implementations of the current subject matter.
Figure 5:
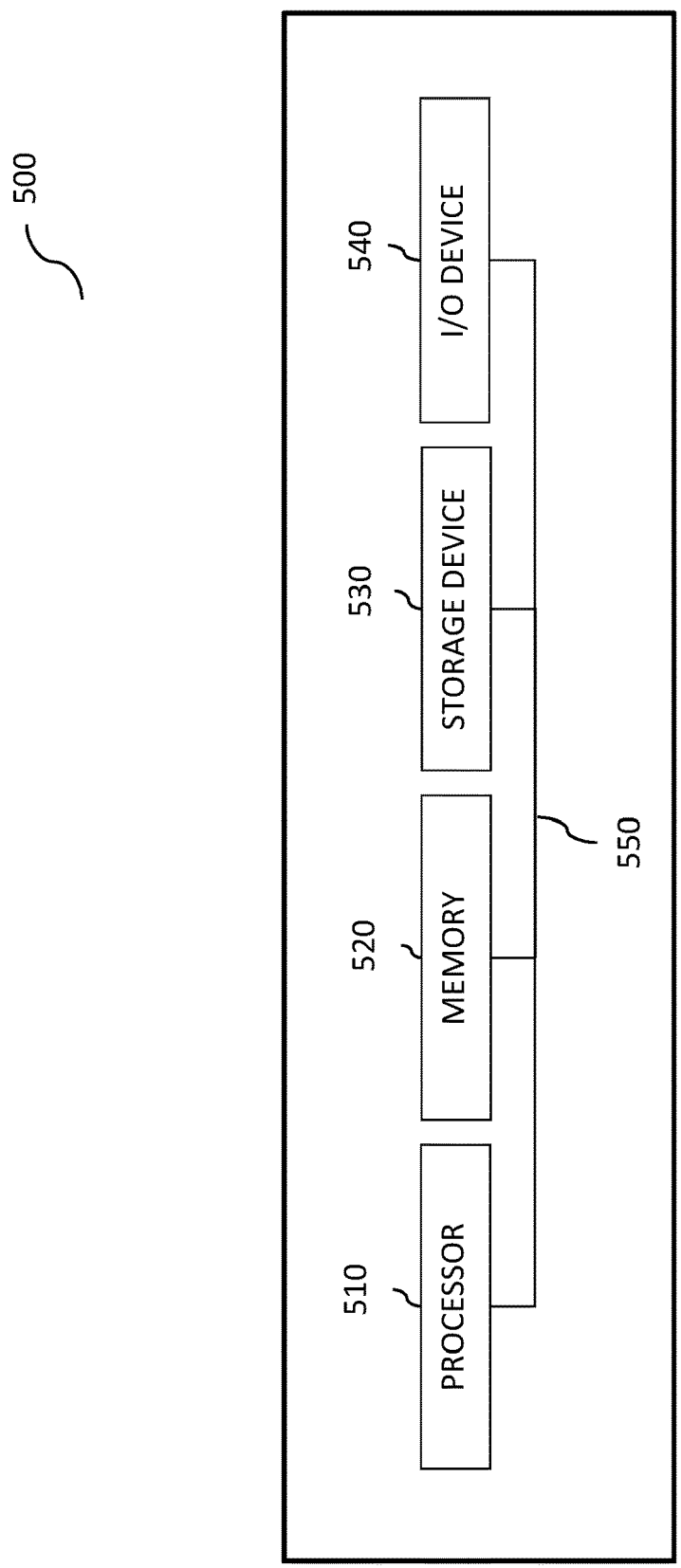

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid-state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
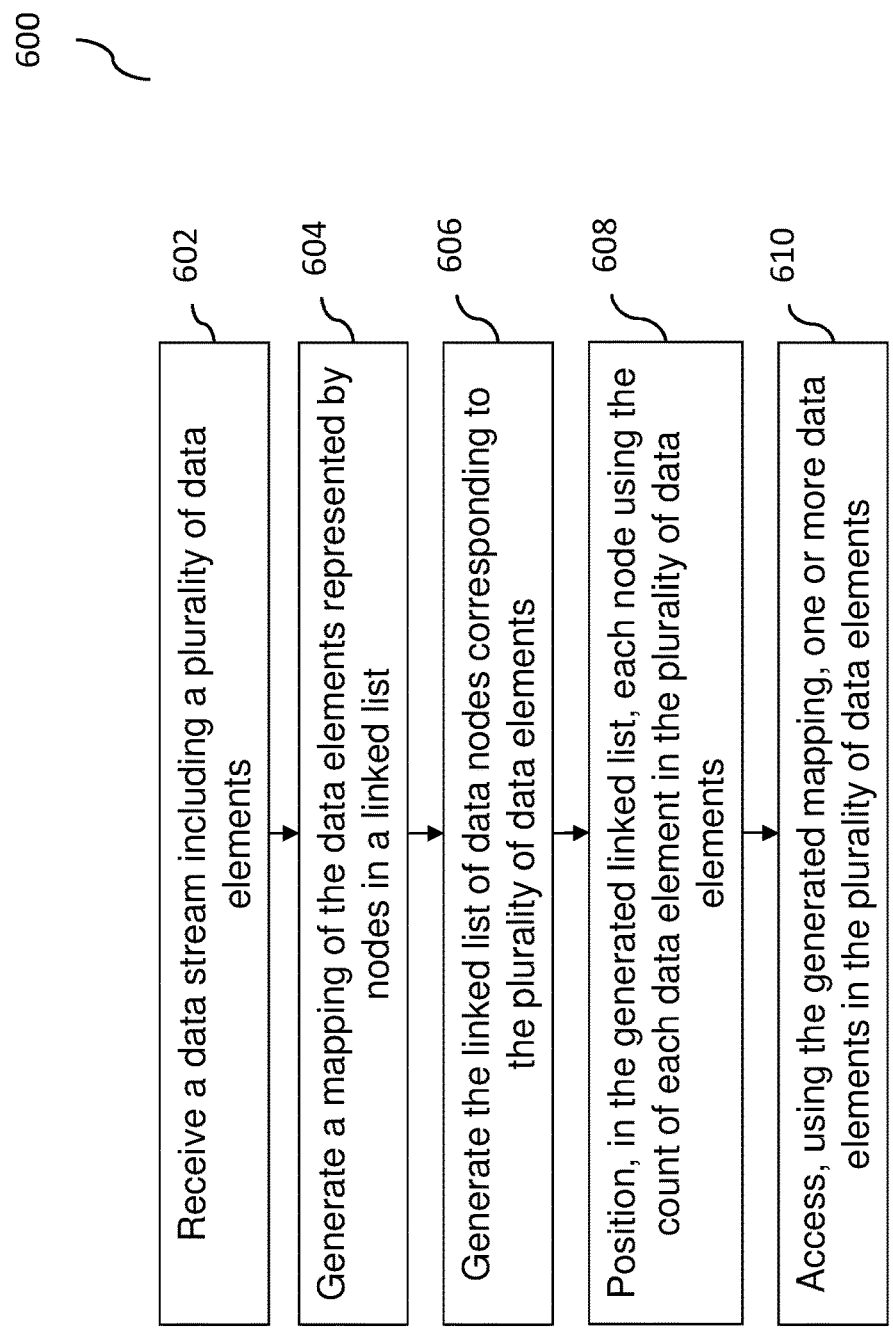
FIG. 6 is an exemplary method, according to some implementations of the current subject matter.

FIG. 6 illustrates an exemplary method 600 for accessing data using a sorted counting mapping, according to some implementations of the current subject matter. The method 600 may be executed by the system 100, including the processing component 112, shown in FIG. 1. The method 600 may be executed in accordance with processes shown in FIGS. 2-4.

At 602, a data stream including a plurality of data elements may be received. The data may be received from the user(s) 102 (shown in FIG. 1), the processing system 104, and/or from any other sources. The data may be aggregated (e.g., using aggregation component 110) into a single stream of data. The data may be any data (e.g., data representing emotions of the user(s)).

At 604, a mapping of the data elements, each of which may be represented by a node in the mapping, may be generated. For example, mapping 120 may be generated by the processing component 112, as shown in FIGS. 1, 2 and 4.

At 606, the linked list of data nodes 114 (e.g., linked list 210 shown in FIG. 2, linked list 410 shown in FIG. 4) corresponding to the plurality of data elements may be generated. The linked list may include a starting element (e.g., a head 202) and an ending element (e.g., a tail 204). Each node 114 in the linked list may store a count of a data element in the plurality of data elements and the corresponding data element (e.g., using a key-value data structure). The count may represent the number of times the data element is present and/or encountered in the data stream.

At 608, each node may be positioned in the generated linked list using the count of each data element in the plurality of data elements. An exemplary positioned processes are illustrated in FIG. 2 at stages 201-219 and in FIG. 4 at stages 401-419. The data elements in the plurality of data elements having a highest count may be configured to be positioned proximate to the starting element of the linked list and data elements in the plurality of data elements having a lowest count are configured to be positioned proximate to the ending element of the linked list.

At 610, using the generated mapping, one or more data elements in the plurality of data elements may be accessed.

In some implementations, the current subject matter can include one or more of the following optional features. In some implementations, each node in the linked list may be configured to store one or more identifiers identifying one or more adjacent nodes (e.g., previous and next nodes in the linked list) to the node.

In some implementations, at least one of the starting elements and the ending element may be configured to include an identifier and a position in the linked list of each data element. The positioning of nodes may include comparing counts included in one or more nodes in the linked list to determine a position of each node in the linked list.

In some implementations, the linked list may include a plurality of sections of nodes, each section of nodes in the plurality of nodes is linked to at least another section of nodes in the plurality of nodes. Each section of nodes in the plurality of sections of nodes may include one or more nodes having data elements with a predetermined count. Sections of nodes in the plurality of sections of nodes having nodes including data elements with a highest count may be configured to be positioned proximate to the starting element of the linked list and sections of nodes in the plurality of sections of nodes having nodes including data elements with a lowest count may be configured to be positioned proximate to the ending element of the linked list. Further, each section of nodes in the plurality of sections of nodes may include a corresponding section starting element and a corresponding section ending element. Each section starting element and each section ending element may be a node in the corresponding section of nodes.

In some implementations, data elements in the plurality of data elements may include at least one of the following: a video data, an audio data, an image data, a text data, a speech data, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating a linked list of a plurality of nodes corresponding to a plurality of data elements, the linked list including a starting element and an ending element, each node in the plurality of nodes is linked to at least another node in the plurality of nodes, each node in the linked list storing a count of a data element in the plurality of data elements, the count representing a number of times the data element is present in a data stream; and
positioning, in the generated linked list, each node using the count of each data element in the plurality of data elements, wherein data elements in the plurality of data elements having a highest count are configured to be positioned proximate to the starting element of the linked list and data elements in the plurality of data elements having a lowest count are configured to be positioned proximate to the ending element of the linked list.

2. The method according to claim 1, wherein each node in the linked list is configured to store one or more identifiers identifying one or more adjacent nodes to the node.

3. The method according to claim 1, wherein at least one of the starting element and the ending element is configured to include an identifier and a position in the linked list of each data element.

4. The method according to claim 1, wherein the positioning includes comparing counts of one or more nodes in the linked list to determine a position of each node in the linked list.

5. The method according to claim 1, wherein the linked list includes a plurality of sections of nodes, each section of nodes in the plurality of sections of nodes is linked to at least another section of nodes in the plurality of sections of nodes.

6. The method according to claim 5, wherein each section of nodes in the plurality of sections of nodes includes one or more nodes having data elements with a predetermined count.

7. The method according to claim 6, wherein sections of nodes in the plurality of sections of nodes having nodes including data elements with a highest count are configured to be positioned proximate to the starting element of the linked list and sections of nodes in the plurality of sections of nodes having nodes including data elements with a lowest count are configured to be positioned proximate to the ending element of the linked list.

8. The method according to claim 7, wherein each section of nodes in the plurality of sections of nodes includes a corresponding section starting element and a corresponding section ending element, each section starting element and each section ending element is a node in the corresponding section of nodes.

9. The method according to claim 1, wherein data elements in the plurality of data elements include at least one of the following: a video data, an audio data, an image data, a text data, a speech data, and any combination thereof.

10. The method according to claim 1 further comprising: receiving the data stream including the plurality of data elements.

11. The method according to claim 1 further comprising: generating a mapping of the plurality of data elements, each data element being represented by a data node in the generated mapping.

12. The method according to claim 11 further comprising: accessing, using the generated mapping, one or more of the data elements in the plurality of data elements.

13. A system comprising:
at least one processor; and
at least one memory storing instructions that, when executed by the at least one processor, cause the at least one processor to perform operations comprising:
generating a linked list of a plurality of nodes corresponding to a plurality of data elements, the linked list including a starting element and an ending element, each node in the plurality of nodes is linked to at least another node in the plurality of nodes, each node in the linked list storing a count of a data element in the plurality of data elements, the count representing a number of times the data element is present in a data stream; and
positioning, in the generated linked list, each node using the count of each data element in the plurality of data elements, wherein data elements in the plurality of data elements having a highest count are configured to be positioned proximate to the starting element of the linked list and data elements in the plurality of data elements having a lowest count are configured to be positioned proximate to the ending element of the linked list.

14. The system according to claim 13, wherein each node in the linked list is configured to store one or more identifiers identifying one or more adjacent nodes to the node.

15. The system according to claim 13, wherein at least one of the starting element and the ending element is configured to include an identifier and a position in the linked list of each data element.

16. The system according to claim 13, wherein the positioning includes comparing counts of one or more nodes in the linked list to determine a position of each node in the linked list.

17. The system according to claim 13, wherein the linked list includes a plurality of sections of nodes, each section of nodes in the plurality of sections of nodes is linked to at least another section of nodes in the plurality of sections of nodes.

18. The system according to claim 17, wherein each section of nodes in the plurality of sections of nodes includes one or more nodes having data elements with a predetermined count.

19. A system according to claim 18, wherein sections of nodes in the plurality of sections of nodes having nodes including data elements with a highest count are configured to be positioned proximate to the starting element of the linked list and sections of nodes in the plurality of sections of nodes having nodes including data elements with a lowest count are configured to be positioned proximate to the ending element of the linked list.

20. A computer program product comprising a non-transitory machine-readable medium storing instructions that, when executed by at least one programmable processor, cause the at least one programmable processor to perform operations comprising:
generating a linked list of a plurality of nodes corresponding to a plurality of data elements, the linked list including a starting element and an ending element, each node in the plurality of nodes is linked to at least another node in the plurality of nodes, each node in the linked list storing a count of a data element in the plurality of data elements, the count representing a number of times the data element is present in a data stream; and
positioning, in the generated linked list, each node using the count of each data element in the plurality of data elements, wherein data elements in the plurality of data elements having a highest count are configured to be positioned proximate to the starting element of the linked list and data elements in the plurality of data elements having a lowest count are configured to be positioned proximate to the ending element of the linked list.

* * * * *